United States Patent Office 2,870,339
Patented Jan. 20, 1959

2,870,339

FABRICATION OF NEUTRON SOURCES

John H. Birden, Dayton, Ohio, assignor to the United States of America as represented by the United States Atomic Energy Commission No Drawing. Application January 11, 1956
Serial No. 558,597

4 Claims. (Cl. 250—84.5)

The present invention relates to methods for preparing neutron sources, and more especially to improved methods for preparing neutron sources from polonium-210 and boron. This invention especially relates to an improved method for fabricating polonium-boron neutron sources to achieve substantially higher efficiencies in neutron production than when utilizing the methods and techniques described in my co-pending application S. N. 542,117(48), filed October 21, 1955.

Neutron sources of the prior art have commonly been formed from radium and beryllium. Such sources are prepared by slurrying finely ground beryllium powder in an aqueous solution of radium bromide, evaporating to dryness, and compressing the residual powder into a pellet. The pellet must be placed in a gas-tight container to confine the radon decay product. Sources thus produced are not entirely satisfactory because their intensity changes continuously over the first few weeks after preparation, due to accumulation of radioactive decay products of radium. More important, such sources produce a high gamma-ray hazard, since one curie of radium produces .05 roentgen in 3.5 minutes at a distance of one meter.

To reduce dangerous gamma activity, sources have been prepared using polonium-210 with a neutron emitter such as beryllium or boron by methods described in my co-pending application, supra. While the neutron yield is much less than that of a radium source, the dangerous gamma radiation is reduced by a factor of $10^4$. In addition, the amount of polonium per curie is so small that self-adsorption of alphas is negligible, compared to that in radium. Moreover, no radioactive gas similar to radon is formed from the polonium.

In the novel method of source preparation disclosed in my co-pending application, supra, the boron or beryllium is reduced to a finely ground powder and inserted in a metal container, the polonium-210 is inserted in the container, the container is sealed, and the sealed container is heated at an elevated temperature for a time sufficient to distribute the polonium over he surface of the neutron emitting powder, the heating is terminated, and the source is allowed to cool. When beryllium is employed as the neutron emitter, the heat treatment causes the polonium to unite chemically with the beryllium, so that upon cooling, the polonium remains disposed throughout the powder, and the sources thus produced remain of constant intensity. I have found, however, that boron sources decrease substantially in intensity upon cooling, and are then relatively inefficient. I have postulated that the polonium tends to leave the boron and deposit on the metal container, so that it does no remain distributed uniformly throughout the boron. While such relatively inefficient boron sources are nevertheless useful, it is highly desirable to improve their neutron-producing efficiency to reduce the cost and size of sources relative to the neutron flux produced.

With a knowledge of the difficulties associated with production of neutron sources with boron in the prior art, it is in object of the present invention to provide an improved method for fabricating neutron sources employing boron. Another object of my invention is to provide an improved method for farbication of polonium-boron neutron sources. Yet another object of the invention is to provide an improved method of fabrication of neutron sources including the volatilization of polonium onto boron, by which method the polonium is prevented from detaching itself from the boron upon cooling with the resulting weakening of the strength of the source. A primary object of the invention is to provide a method for fabricating boron neutron sources including the steps of first coating the boron powder with an element capable of forming a polonide, then volatilizing polonium onto the coated powder by a slow heating process, and cooling the source after the polonium has united chemically with the coating material, by which method the polonium remains distributed uniformly throughout the boron powder and the neutron flux remains substantially at the maximum value.

These and other objects of the present invention will become apparent from the following detailed descriptions of preferred methods for preparing neutron sources in accordance with the teachings of my invention.

In practicing my invention, the source materials are sealed inside a container, which may be of any convenient shape, but cup-shaped cylinders having plugs in their open ends are preferred. The containers should be fabricated from materials which are not adversely affected by the source-fabricating operations, which will not combine chemically with substantial quantities of polonium, and to which polonium does not adhere readily. I prefer to fabricate containers from cold-rolled steel, although, wrought-iron and other suitable materials may be used.

The polonium may be introduced into the container by first plating it upon a metal foil and then placing the foil inside the container. Alternatively, the polonium may be deposited on the interior walls of the container by volatilization techniques. For example, the open container may be placed in a vacuum chamber in spaced relation with the foil containing the polonium. While the foil is heated, as by induction, the container is cooled, as by a cold finger, below the temperature of the foil so that the polonium will transfer from the foil to the inside walls of the container.

Boron powder is prepared for use in the source by first forming a thin coating uniformly throughout the powder of a substance capable of forming a polonide and also characterized by good adherence to the boron. The following materials meet these requirements: nickel, platinum, and silver. Other materials may be found which are suitable to a lesser degree. The coating may be formed in any conventional manner such as by evaporation, sputtering, chemical reduction, or the like. When the boron powder is coated with silver, I prefer to use the well-known Rochelle salt mirror process. Platinum is preferably deposited by repeated volatilizations of the platinum off a hot tungsten wire in a vacuum system. Nickel coating may be done by thermal decomposition of nickel carbonyl in a vacuum, as in the container sealing operation below. The amounts of coating material required are only slightly in excess of the amounts theoretically required to form the polonides, so that only a thin coat is formed.

The container may be sealed by applying a coating of nickel to the outer surface. This is preferably accomplished by placing the container in an atmosphere of nickel carbonyl and heating it by induction to the desired temperature. A coating of 0.02 inch of nickel has proved satisfactory to insure an impervious seal and to prevent escape of radioactive material from the interior. Other coating materials or other coating thicknesses may be employed, neither the material nor the coat thickness being critical in source productions, so long as the container is sealed.

The source may be heated by an induction heater or other furnace provided with temperature control means in a vacuum or in an inert atmosphere, such as helium, to prevent oxidation. The temperature should be monitored by a thermocouple and the neutron flux by a neutron rate meter. The temperature is increased very slowly, allowing slow volatilization of the polonium off the foil or container walls. The heating should be stopped when the desired flux reaches a maximum and begins to level off. This may be accomplished by an operator manually or through a switch responsive to recorder pen movement, for example. The container is heated to a temperature sufficient to cause volatilization of the polonium inside the container, causing it to distribute uniformly throughout the boron powder and unite chemically with the coating substance, volatilization occurring at temperatures above about 450° C. If the source does not reach the desired strength upon a first heating, it may be allowed to cool and then heated again.

The following examples illustrate some of the permissible variations and alternatives in preparing neutron sources in accordance with my novel method.

*Example I*

Substantially 5 grams of 230 to 325 mesh (U. S. standard sieve) boron powder was coated with silver by the Rochelle salt process. About 0.014 gram of silver per gram of boron powder was deposited. 1.8 grams of boron powder coated with silver, was placed in a cold-rolled steel container, .66 inch in outer diameter and .66 inch high. About 3.46 curies of polonium-210 was volatilized into the source container in a vacuum, the silver coated boron powder was added to the container, and the container was closed. The container was sealed by heating in nickel carbonyl at a pressure of approximately 3 cm. Hg. Heating was continued and the nickel was deposited until the external dimensions reached .7 inch in diameter and .7 inch in height, at which time the source was removed from the nickel atmosphere. The source was monitored with a neutron counter and produced a total neutron flux of $1.145 \times 10^6$ neutrons per second.

The neutron efficiency of this source was then 40.65%, based on a thick target yield for boron of 22 neutrons per $10^6$ alphas, which is equivalent to $8.14 \times 10^5$ neutrons per second per curie of polonium at 100% efficiency.

The source was then placed in a vacuum system and heated in helium at a pressure of 10 cm. Hg. The temperature and the neutron flux were monitored and continuously recorded while the neutron source was heated by induction. The temperature of the source was increased slowly and gradually to about 500° C., and maintained there until the flux reached a maximum value of $1.891 \times 10^6$ neutrons per second, after which the source was cooled. The neutron efficiency had then increased to 67.14%.

*Example II*

A source was prepared in exactly the same way as that in Example I, except that the boron powder was uncoated. The neutron flux recorder chart indicated that the neutron flux produced by the source increased with increase of temperature in the manner above stated to about $1.9 \times 10^6$ neutrons per second, but it returned to the original value of about $1.1 \times 10^6$ neutrons per second when the source was allowed to cool. The source of Example I maintained its increased neutron flux of about $1.9 \times 10^6$ neutrons per second even after cooling. Comparison of these two otherwise identical sources indicates that the additional coating step provided in my novel method was required in order to maintain good uniform distribution of the polonium throughout the powder, and here increased the neutron flux by over 70% of otherwise identical sources.

*Example III*

Platinum was volatilized from a tungsten wire and deposited on a thin layer of boron powder, 120 to 170 mesh (U. S. standard sieve), in a high vacuum. About .0014 gram of platinum per gram of boron powder was applied. One gram of uncoated powder was mixed with one gram of the coated powder. The source was then fabricated as in Example I. When the source was sealed, a neutron flux of $1.85 \times 10^6$ neutrons per second was indicated, 4.995 curies of polonium having been used, indicating a neutron efficiency of 45.5%. The source was then heated to about 510° C. and the flux reached $3.22 \times 10^6$ neutrons per second before leveling off. A neutron efficiency of 79.2% was indicated. The flux did not return to its previous level but maintained its strength, substantially 70% greater than before the heating step.

It will be apparent to those skilled in the art that I have devised an improved method of fabricating neutron sources from polonium-210 and boron which greatly increases the neutron efficiency of these sources. From the foregoing examples, it may be seen that sources producing substantially 70% higher neutron fluxes than those prepared according to prior methods with identical amounts of polonium and boron may be fabricated according to my improved method.

Having thus described my invention, I claim:

1. A method for preparing a source of neutrons comprising the steps of inserting in a container a quantity of polonium-210, coating boron powder with a material chosen from the group consisting of silver, platinum, and nickel, inserting said coated powder in said container, sealing said container to prevent escape of the enclosed material, and heating said container to a temperature above substantially 450° C. for a selected time interval to effect chemical combination of said polonium with said coating material.

2. A method for preparing a source of neutrons comprising the steps of coating uniformly a quantity of boron powder with silver, introducing polonium into a metal container, introducing said coated power into said container, sealing said container to prevent escape of the materials therein, slowly raising the temperature of said source to above substantially 450° C. and continuously heating said source to volatilize said polonium, indicating the neutron flux from said source, terminating said heating step responsive to said flux indication after said flux ceases to increase.

3. A method for preparing a source of neutrons comprising the steps of inserting in a container a quantity of polonium-210, contacting a quantity of boron powder with nickel by thermal decomposition of nickel carbonyl, inserting said coated powder in said container, sealing said container with a nickel coating, slowly raising the temperature of said container to above substantially 450° C., monitoring and indicating the neutron flux emitted by said source, and terminating said heating step when said neutron flux reaches a selected level.

4. A method for preparing a source of neutrons comprising the step of volatilizing a quantity of polonium-210 into a container, vaporizing platinum from a hot filament onto a quantity of boron powder, placing said powder in said container with said polonium, sealing said container to prevent escape of the enclosed material, measuring the neutron flux emitted by said source, slowly raising the temperature of said container to above substantially 450° C. by induction heating, and terminating said heating step responsive to said neutron flux reaching a selected level.

References Cited in the file of this patent

UNITED STATES PATENTS

| | | |
|---|---|---|
| 2,440,999 | Anderson | May 4, 1948 |
| 2,573,069 | Segre | Oct. 30, 1951 |
| 2,592,115 | Carroll | Apr. 8, 1952 |

OTHER REFERENCES

TID–5087, U. S. Atomic Energy Commission document dated July 1952, declassified Nov. 29, 1955, pp. 7, 8.

The Reactor Handbook, vol. I, AECD–3645, Atomic Energy Commission declassified edition, Feburary 1955, pp. 3, 4, 5.